United States Patent
Hößle et al.

(10) Patent No.: US 11,279,174 B2
(45) Date of Patent: Mar. 22, 2022

(54) AXLE SYSTEM

(71) Applicant: SAF-HOLLAND GmbH, Bessenbach (DE)

(72) Inventors: Florian Hößle, Bessenbach (DE); Kerstin Kreiner, Aschaffenburg (DE); Armin Christ, Bessenbach (DE)

(73) Assignee: SAF-HOLLAND, GmbH, Bessenbach (DE)

( * ) Notice: Subject to any disclaimer, the term of this patent is extended or adjusted under 35 U.S.C. 154(b) by 368 days.

(21) Appl. No.: 16/332,884

(22) PCT Filed: Aug. 31, 2017

(86) PCT No.: PCT/EP2017/071856
§ 371 (c)(1),
(2) Date: Mar. 13, 2019

(87) PCT Pub. No.: WO2018/050442
PCT Pub. Date: Mar. 22, 2018

(65) Prior Publication Data
US 2019/0248180 A1    Aug. 15, 2019

(30) Foreign Application Priority Data

Sep. 13, 2016 (DE) .................... 10 2016 117 164.6
Sep. 13, 2016 (DE) .................... 20 2016 105 072.3

(51) Int. Cl.
*B60B 35/04* (2006.01)
*B60B 35/00* (2006.01)
*B60B 27/00* (2006.01)
*B60K 7/00* (2006.01)
*B60B 35/16* (2006.01)
(Continued)

(52) U.S. Cl.
CPC .......... *B60B 35/04* (2013.01); *B60B 27/0063* (2013.01); *B60B 35/006* (2013.01); *B60B 35/166* (2013.01); *B60K 7/0015* (2013.01); *B60B 35/08* (2013.01); *B60B 2900/111* (2013.01); *B60B 2900/321* (2013.01); *F16D 2051/003* (2013.01); *F16D 2055/0008* (2013.01)

(58) Field of Classification Search
CPC ....... B60B 35/04; B60B 35/006; B60B 35/02; B60B 27/0063
See application file for complete search history.

(56) References Cited

FOREIGN PATENT DOCUMENTS

| CN | 105793074 B | 12/2017 |
|---|---|---|
| CN | 105270091 A | 7/2019 |

(Continued)

OTHER PUBLICATIONS

European Patent Office; International Search Report; dated Jan. 8, 2018.

*Primary Examiner* — Jason R Bellinger
(74) *Attorney, Agent, or Firm* — Price Heneveld LLP

(57) ABSTRACT

An axle system includes an axle stub, a first connecting section and a second connecting section, wherein the axle stub is embodied on its outer side so as to be essentially rotationally symmetrical about a stub axis and has two ducts which extend parallel to the stub axis in certain regions, wherein the connecting sections lie in a connecting plane which is oriented orthogonally with respect to the stub axis, wherein the axle stub has an attachment region for securing a brake carrier which extends parallel to the connecting plane.

20 Claims, 4 Drawing Sheets

Fig. 4

(51) Int. Cl.
    *B60B 35/08*           (2006.01)
    *F16D 55/00*          (2006.01)
    *F16D 51/00*          (2006.01)

(56) References Cited

FOREIGN PATENT DOCUMENTS

| | | | |
|---|---|---|---|
| DE | 10201421832 | 3/2016 | |
| DE | 102014218331 | 3/2016 | |
| DE | 102017107207 A1 * | 10/2018 | ............. B60B 35/08 |
| FR | 2291888 | 6/1976 | |
| WO | WO-2016038025 A1 * | 3/2016 | ............. B60B 35/08 |

* cited by examiner

AXLE SYSTEM

BACKGROUND OF THE INVENTION

The present invention relates to an axle system, in particular for operating and supporting a hydraulic additional motor.

Axle systems for supporting hydraulic additional motors and further vehicle components are already known to a certain degree from the prior art. In this context, an additional drive, for example a hydrostatic motor, is secured to the end of an axle stub and transmits a torque to the wheel suspension which is supported on the axle stub. In order to supply the additional motor with energy, for example via electrical cables or hydraulic lines, it is known to lead external lines and hoses to the additional motor. Furthermore, it is known to form in the axle stub drilled holes, in particular ducts, through which lines can be plugged in order to be able to supply the additional motor with corresponding electrical energy or a hydraulic fluid. Owing to the weakening of the axle stub by the lines which are introduced, the axle stub must be given larger dimensions here, and the problem also arises that the attachment of further chassis components, such as for example of a brake carrier or of a radius link element, to the axle stub has to bring about further over-dimensioning. There is a large need for improvement here, wherein, in particular, the installation space which is taken up by the axle system and the weight of the axle system have to be optimized.

The object of the present invention is to make available an axle system which permits a hydraulic additional drive to be supplied with hydraulic fluid and at the same time brings about a lower weight and an improved service life as well as a smaller installation space than the solutions which are known from the prior art.

SUMMARY OF THE INVENTION

According to the invention, the axle system comprises an axle stub, a first connecting section and a second connecting section, wherein the axle stub is embodied on its outer side so as to be essentially rotationally symmetrical about a stub axis and has two ducts which extend parallel to the stub axis in certain regions, wherein the connecting sections lie in a connecting plane which is oriented orthogonally with respect to the stub axis, wherein the axle stub has an attachment region for securing a brake carrier which extends parallel to the connecting plane. The axle stub is preferably a component which is embodied essentially in the form of a solid body and in which at least two ducts are formed, said ducts extending essentially parallel to the stub axis. In this context, the ducts also each have a section which extends transversely with respect to the stub axis, with the result that the ducts emerge laterally from the axle stub and open into one connecting section each. The connecting sections are arranged here in a plane in such a way that with respect to the length of the axle stub they are arranged along the stub axis essentially at the same height. The connecting plane in which the connecting sections lie is preferably oriented in such a way that it intersects each connecting section centrally. Furthermore, the connecting plane is arranged orthogonally or perpendicularly with respect to the stub axis. At a first distal end, the axle stub preferably has a bearing region for securing the wheel bearing of a wheel suspension system. Adjacent to the bearing region, or directly to the side thereof, the axle stub has an attachment region for securing a brake carrier. The brake carrier is here a component to which a brake caliper of a disk brake or preferably a bearing device and an activation unit for brake shoes of a drum brake can be secured. The brake carrier engages here only in the region of the attachment region on the axle stub. The attachment region is preferably embodied as a rotationally symmetrical or cylindrical face which is provided on the outer side of the axle stub and to which the brake carrier is preferably permanently welded or bonded or embodied in one piece with the axle stub. In the latter preferred case, the axle stub can be embodied together with the brake carrier as a forged part or as a cast part. The ducts in the axle stub extend from the first distal end of the axle stub, through and under the attachment region and up to the first and second connecting sections. Owing to the arrangement of the connecting sections in a connecting plane which is oriented perpendicularly with respect to the stub axis and preferably essentially parallel to the attachment region of the axle stub, the connecting sections can be arranged very close to the attachment region and therefore very close to the brake carrier which can be secured to the axle stub. In this way it is possible to bring about a significant reduction in the installation space which is required for the connecting sections and the brake carrier. In particular, the axial extent of the region in which the connecting sections are provided on the axle stub is particularly small in the case of the present invention.

The minimum distance of the connecting sections from the attachment region is advantageously less than a third of the axle stub diameter in the region of the attachment region. The minimum distance of the connecting sections from the attachment region is here an expression of how closely the connecting sections are arranged on the attachment region for the brake carrier and therefore on the brake carrier itself, in the installed state thereof. This minimum distance here with respect to the axle stub diameter in the region of the attachment region for the brake carrier is less than a third of this axle stub diameter. It has become apparent that in so far as the minimum distance is kept below a third of the axle diameter, a particularly compact design of the axle system can be achieved. For specific possible applications it may, however, be necessary for a minimum distance of, for example, one quarter not to be undershot in order to leave sufficient space free for the use of tools, in particular for the securement of connecting sections to the axle stub.

The ratio of the minimum distance of the connecting sections of the attachment region to the axle stub diameter in the region of the attachment region is particularly preferably here between 0.05 and 0.25 and preferably approximately 0.1 to 0.2. A minimum distance of the connecting sections from the attachment region of only 0.05 of the axle stub diameter is particularly preferred here if the tool which is required for securing the connecting sections to the axle stub requires virtually no installation space, or only very little installation space. In this case, a particularly compact design of the axle system can be achieved. The preferred range of 0.20 to 0.25 has proven appropriate, in particular, when in the region of the connecting sections is to be accessible to a user from various directions with respect to the axle system with a tool, in order to secure the connecting sections to the axle stub.

The axle stub preferably has a partially polygonal cross section in the region of the connecting sections. In particular, the axle stub respectively has planar faces at the locations where the connecting sections are formed on or can be secured to the axle stub in which faces a sealed connection between the respective duct and a hydraulic line which is secured in the connecting section can be particularly easily manufactured.

It is particularly preferred that the axle stub has a flattened portion in the region of each of the connecting sections. By virtue of the flattened portion on preferably each of the connecting sections, the drilled holes which are necessary for the connecting sections can be made in the axle stub in a particularly easy way. The axle stub is advantageously embodied in a locally flattened fashion only in the direct vicinity of the connecting sections and is otherwise embodied in a rotationally symmetrical or cylindrical fashion in order to avoid adversely affecting the strength of the axle stub, in particular the torsional rigidity, more than is necessary. The flattened portions can be embodied here as a depression.

In addition the connecting sections extend within a first circle sector lying in the connecting plane, wherein the circle sector extends with a first sector angle, and wherein the first sector angle lies in the range from 25° to 160 and preferably in the range from 45° to 90°. In addition to the arrangement of the connecting sections in such a way that they lie in a common connecting plane, it is also preferred that the connecting sections extend only in a restricted circle sector of a circle extending in the connecting plane, in particular of the cross section of the axle stub. In this context, the circle sector is preferably less than half of the full cross section of the axle stub, with the result that the connecting sections are preferably arranged only on one side of the axle stub, and particularly preferably provided only in a third of the cross section of the axle stub. In this way, sufficient installation space is left free in the neighboring region of the connecting sections in order, for example, to secure a brake caliper to the brake carrier, which extends partially into the connecting plane but does not make contact with the connecting sections here.

A brake carrier with an attachment region for a brake caliper is also preferably secured to the axle stub, wherein the brake caliper extends within a second circle sector which is projected into the connecting plane, wherein the second circle sector extends with a second sector angle, and wherein the second sector angle lies in the range from 90° to 240°, preferably in the range from 160° to 200°. In particular in the event of a brake caliper being secured to the brake carrier and being displaceable relative to the brake carrier essentially parallel to the stub axis, it is necessary to make available a free space in order to permit free movement of the brake caliper without it colliding with the connecting sections. Furthermore, lines must be able to be laid to the brake caliper and to the brake cylinder for supplying the activation element of the brake, which lines must in turn not collide with the lines which can be connected to the connecting sections. For this reason, the brake caliper preferably extends also in a circle sector, wherein this circle sector, preferably projected into the connecting plane, represents the extent of the brake caliper. In the axle system a range for the extent of the brake caliper in a second sector angle of 90° to 240° is preferably possible here. A sector angle in the region of 90° occurs if just one part of the brake caliper moves into the region of the connecting sections or up to the level of the connecting plane. A range of 240° can occur, in particular, if in addition to the brake caliper itself, further peripheral systems which must not collide with the connecting sections are arranged and secured on the brake caliper or adjacent thereto. The angular range from 160° to 240° is the typical circle sector range which is assumed by brake systems with a disk brake and a floating caliper. It is correspondingly advantageous to optimize the axle system for the use of such brake systems.

The second circle sector, i.e. the circle sector from which the brake caliper extends, particularly preferably does not have an overlap with the first circle sector, that is to say the circle sector in which the connecting sections extend. In this way, a collision of the connecting sections with the brake carrier or with the brake caliper which is secured to the brake carrier can be advantageously prevented.

Furthermore, the sum of the first sector angle and of the second sector angle is preferably less than 300° and preferably lies in the range from 220° to 270°. In this way, in addition to the extent of the brake caliper and of the connecting sections further space for further peripheral systems is also kept free in the axle system. Such systems can be, for example, an ABS sensor or temperature sensors in the region of the wheel hub.

In a state in which the axle stub is installed in a utility vehicle, the connecting sections are preferably arranged on the side of the axle stub facing away from the roadway. In particular for the case in which the axle stub is secured in the chassis of the utility vehicle and the utility vehicle is stationary or rolling on a roadway, the connecting sections on the axle stub are preferably provided in the half of the axle stub facing away from the roadway. The circle sector in which the connecting sections extend is therefore also characterized in that this circle sector is at least mainly or completely arranged preferably on the upper side or the side of the axle stub facing away from the roadway. In this way, protection of the connecting sections and of the lines connected thereto against thrown-up foreign bodies can be achieved and therefore the service life of the axle system can be significantly improved.

The connecting sections advantageously each have a screw-in element, wherein the screw-in elements each have an external thread for engagement with the axle stub. The connecting section is advantageously secured to the axle stub by means of a detachable positively locking and frictionally locking connection. The screw-in elements can be connected inseparably to hydraulic lines here, wherein sealing elements are additionally also introduced between the parts which are respectively movable with respect to one another. The advantage of detachable connections between the hydraulic lines and the ducts which are formed in the axle stub is that individual connecting sections can be removed for maintenance purposes without a materially joined or positively locking connection needing to be destroyed.

In particular, an intermediate space with a minimum width is kept free between the connecting sections, wherein the width is 0.8 to 1.5 times the maximum diameter of the connecting sections. The diameter of the connecting sections is here preferably a diameter of a cross section of the connecting sections which is defined perpendicularly with respect to the radial direction of the axle stub. The connecting sections extend here preferably essentially rotationally symmetrically, apart from, if appropriate, external hexagonal geometries for the engagement of a tool, around this radial direction of the axle stub, which direction runs orthogonally with respect to the stub axis. The intermediate space between the connecting sections is preferably to be 0.8 to 1.5 times the maximum diameter of the connecting sections here, wherein this permits, in particular, the use of tools, in particular of keys for screwing the connecting sections to the axle stub.

In addition, the connecting sections are preferably embodied so as to be essentially rotationally symmetrical about one connecting axis each, wherein the connecting axes lie in the connecting plane, wherein the connecting axes span a connecting angle, wherein the connecting angle is greater than 20° and preferably greater than 30°. A connecting angle of more than 20° is sufficient for particularly large axle stubs, since in this case sufficient free space remains between the connecting sections in order to be able to secure preferred screw-in elements to the axle stub with a tool. In the case of a connecting angle which is always greater than or equal to 30°, this sufficient free space is always ensured.

A radius link element preferably is or can be secured indirectly or directly to the axle stub, on the side of the connecting sections facing away from the attachment region, wherein the minimum distance of the connecting sections from the radius link element is less than two thirds of the axle stub diameter in the region of the attachment region. In addition to a brake carrier, a radius link element preferably is or can also be secured to the axle stub. In this context, the connecting sections are preferably arranged between the attachment region for securing the brake carrier and the radius link element. The connecting sections are to be at a corresponding minimum distance here from both adjoining components, which minimum distance does not exceed two thirds of the axle stub diameter in the region of the attachment region. As a result, in turn the installation space of the axle system, or a compact embodiment, can be optimized. As a result, in particular the overall length of the axle stub is reduced and the torques which act on the radius link element can be reduced, since the lever arms, caused by the bending force which is transmitted to the axle stub from the wheel suspension system of the utility vehicle, are reduced. In particular in the case of embodiments in which an axle tube can be secured to the axle stub directly next to the connecting sections, wherein the longitudinal link element is secured to the axle tube, the minimum distance of the connecting sections from the radius link element can be only half the axle stub diameter. The minimum distance of the connecting sections from the radius link element is particularly preferably approximately 50 mm to 60 mm.

In addition to the first and second connecting sections, a further connecting section or further connecting sections which lie in the connecting plane are particularly preferably provided on the axle stub. In addition to the two previously described connecting sections it is preferred that further connecting sections are provided on the axle stub, wherein, of course, further ducts are also formed in the axle stub. Depending on the type of a hydraulic motor which is to be operated in the axle system, it is necessary for more than two lines for hydraulic fluid or the leakage of hydraulic fluid to be formed on the axle stub. Three lines are particularly preferably provided, wherein one line is a dead line which serves to feed back leakage fluid into a reservoir container. In this context, the further connecting sections are preferably also arranged in the connecting plane, with the result that a particularly compact design of the axle stub and therefore of the axle system can be achieved.

Three connecting sections are advantageously provided. Three connecting sections permit, in particular, the arrangement of a hydrostatic motor which has a separate connection for leakage fluid. Leakage fluid can therefore be prevented from escaping into the surroundings, since said leakage fluid can be fed back into a corresponding collecting container in particular via the third line and/or the third duct and the third connecting section.

At least the majority of the connecting sections or all the connecting sections are furthermore preferably at the same distance from the attachment region. In other words, at least the majority of the connecting sections lie in one and the same connecting plane. In this way, the axial overall length of the region in which the connecting sections are arranged can be minimized, which in turn permits a shorter axle stub and reduced bending torques at the axle stub. In particular, if all the connecting sections can be intersected centrally by the connecting plane, the installation space between the attachment region for the brake carrier and the region in which the longitudinal link element is secured can be made particularly short. It goes without saying here that the space which is needed to connect lines to the connecting sections is provided in this preferred case by means of uniform distribution of the connecting sections in various radial directions, as has previously been explained and with reference to the connecting axes.

BRIEF DESCRIPTION OF THE DRAWINGS

Further advantages and features of the present invention emerge from the following description with reference to the appended figures. It goes without saying that individual features which are shown only in one of the figures can also be used in embodiments of other figures unless this has been explicitly ruled out or is prohibited owing to technical conditions.

In the drawings.

DETAILED DESCRIPTION OF THE PREFERRED EMBODIMENTS

Figure 1:
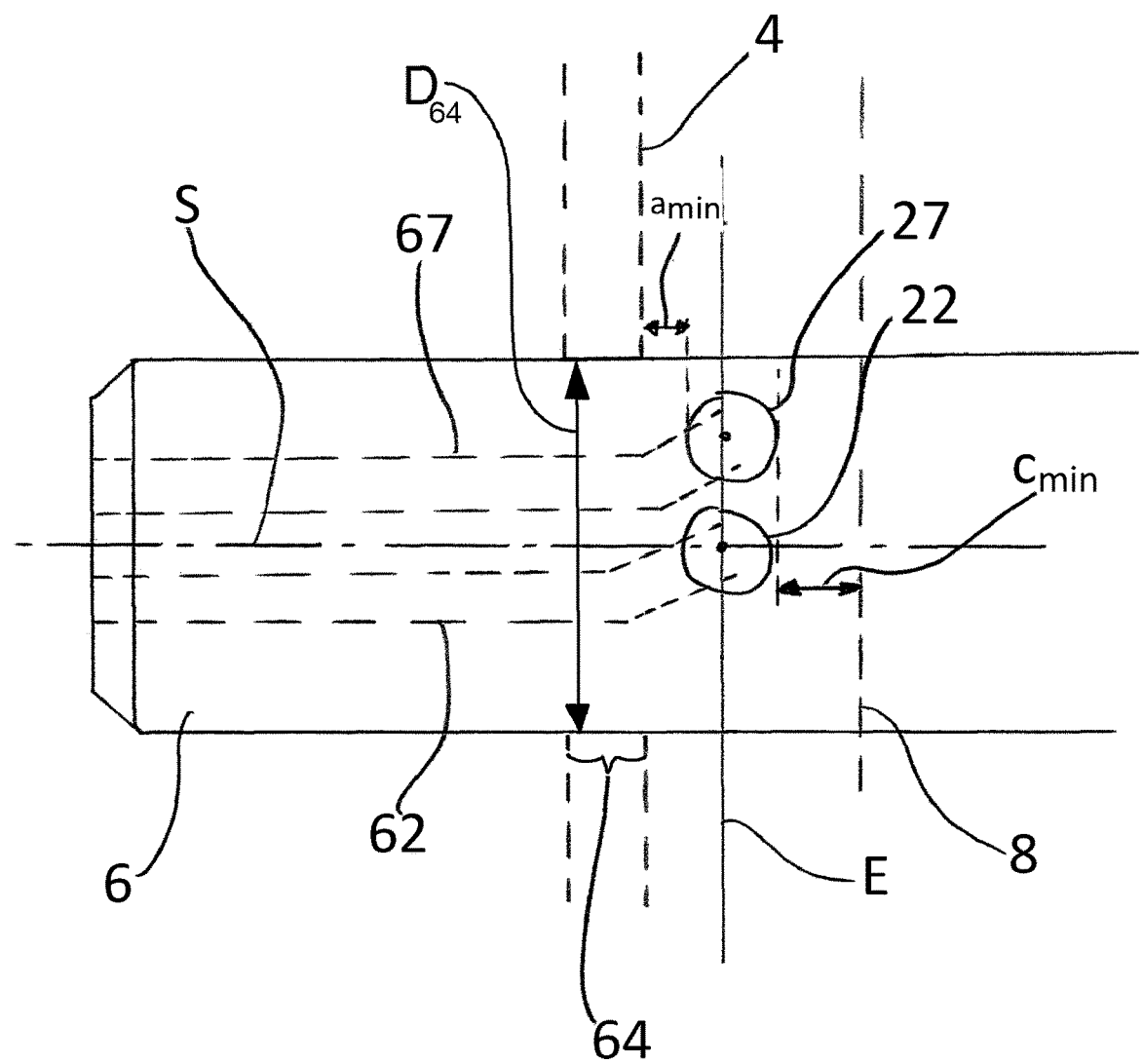
FIG. 1 shows a side view of a preferred embodiment of the axle system according to the invention.

The axle system which is illustrated in FIG. 1 has an axle stub 6 with an attachment region 64 for securing a brake carrier 4 (illustrated by dashed lines). Two ducts 61, 62 are formed in the axle stub 6 and open on the end wall, shown on the left in the figure, of the axle stub 6 and can be placed in a hydraulic operative connection there with an additional motor. On the side facing away from the first distal end shown on the left, the ducts each have a section which runs transversely with respect to the stub axis S and which ultimately opens into a connecting section 21, 22 in the region of the lateral face of the axle stub 6. A dashed line illustrates merely that a longitudinal link element 8 can also be secured to the axle stub 6, wherein the connecting sections 21, 22 are preferably arranged between the longitudinal link element 8 and the brake carrier 4. Furthermore, it is illustrated that a sensor holder is formed in the region between the connecting sections and the brake carrier 4. The connecting sections 21, 22 extend here in such a way that they are intersected essentially centrally by a connecting plane E. The connecting plane E lies here according to the invention orthogonally with respect to the stub axis S. The minimum distance $a_{min}$ of the connecting sections 21, 22 from the attachment region 64 is preferably less than a third of the axle stub diameter $D_{64}$ in the region of the attachment region 64. Furthermore, the minimum distance $c_{min}$ of the connecting sections 21, 22 from the radius link element 8 which is indicated on the right in the figure is preferably less than two thirds of the axle stub diameter $D_{64}$ in the region of the attachment region 64. In the illustrated preferred embodiment, this minimum distance $c_{min}$ is approximately 50 mm to 60 mm.

Figure 2:
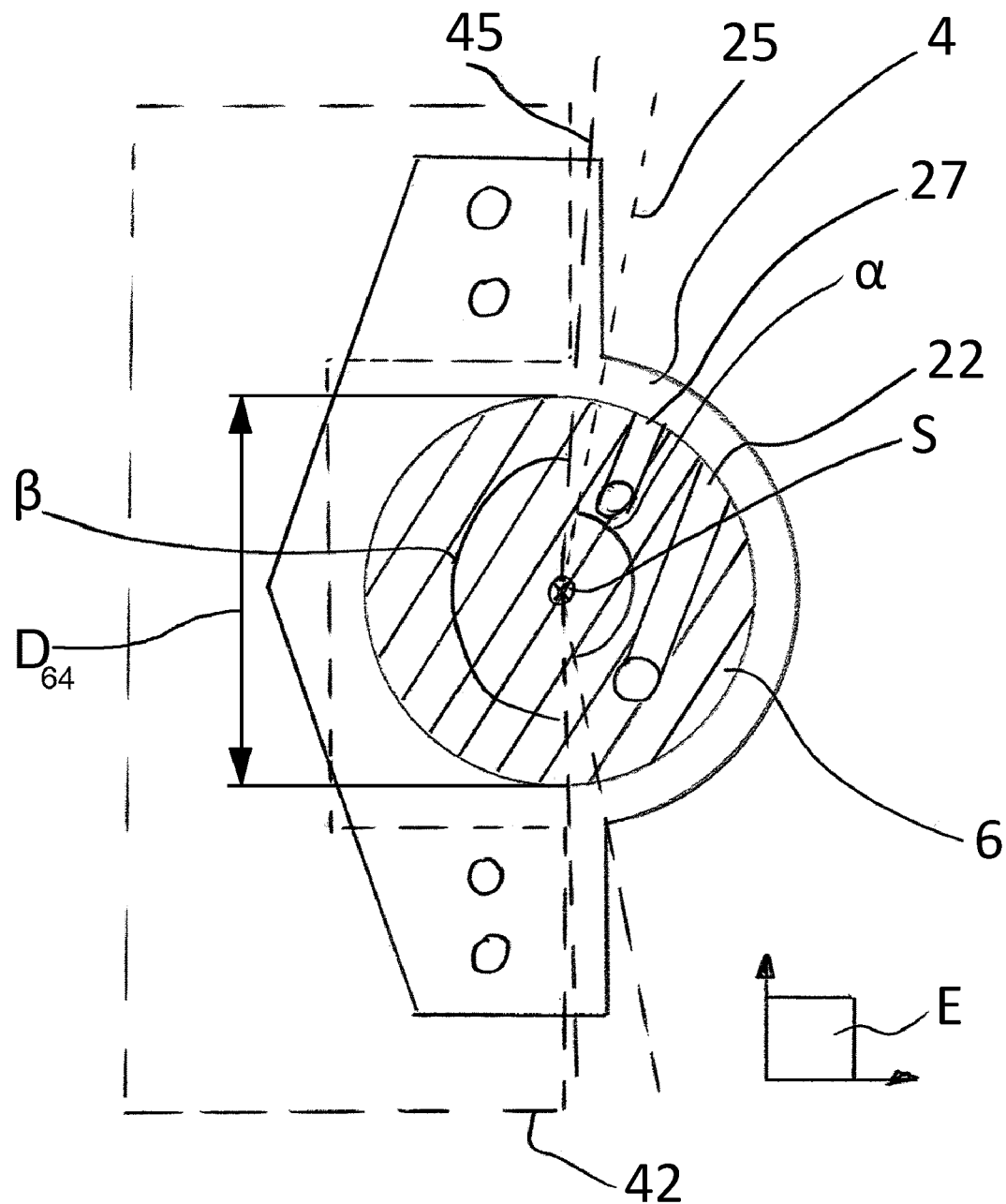
FIG. 2 shows a view, in section in the connecting plane, of the axle system shown in FIG. 1.

FIG. 2 shows a view which is sectional in the connecting plane E, of the axle system shown in FIG. 1. The extent of the brake carrier 4 which is indicated by dashed lines is illustrated here, on which brake carrier 4 a brake caliper 42, illustrated by dashed lines, can be secured in such a way that it remains capable of being slid with respect to the brake carrier 4, parallel to the stub axis S. FIG. 2 also shows the first circle sector 25 which extends with a first sector angle α. In this context, the first connecting section 21 and the second connecting section 22 are arranged inside the first circle sector 25. Furthermore, it is preferred that the brake caliper 42 extends within a second circle sector 45, wherein the second circle sector 45 preferably extends along a second sector angle β. In FIG. 2 it becomes clear that the first circle sector 25 and the second circle sector 45 do not form an overlap but instead, quite on the contrary, a relatively large angular scope remains free between the two circle sectors.

Figure 3:
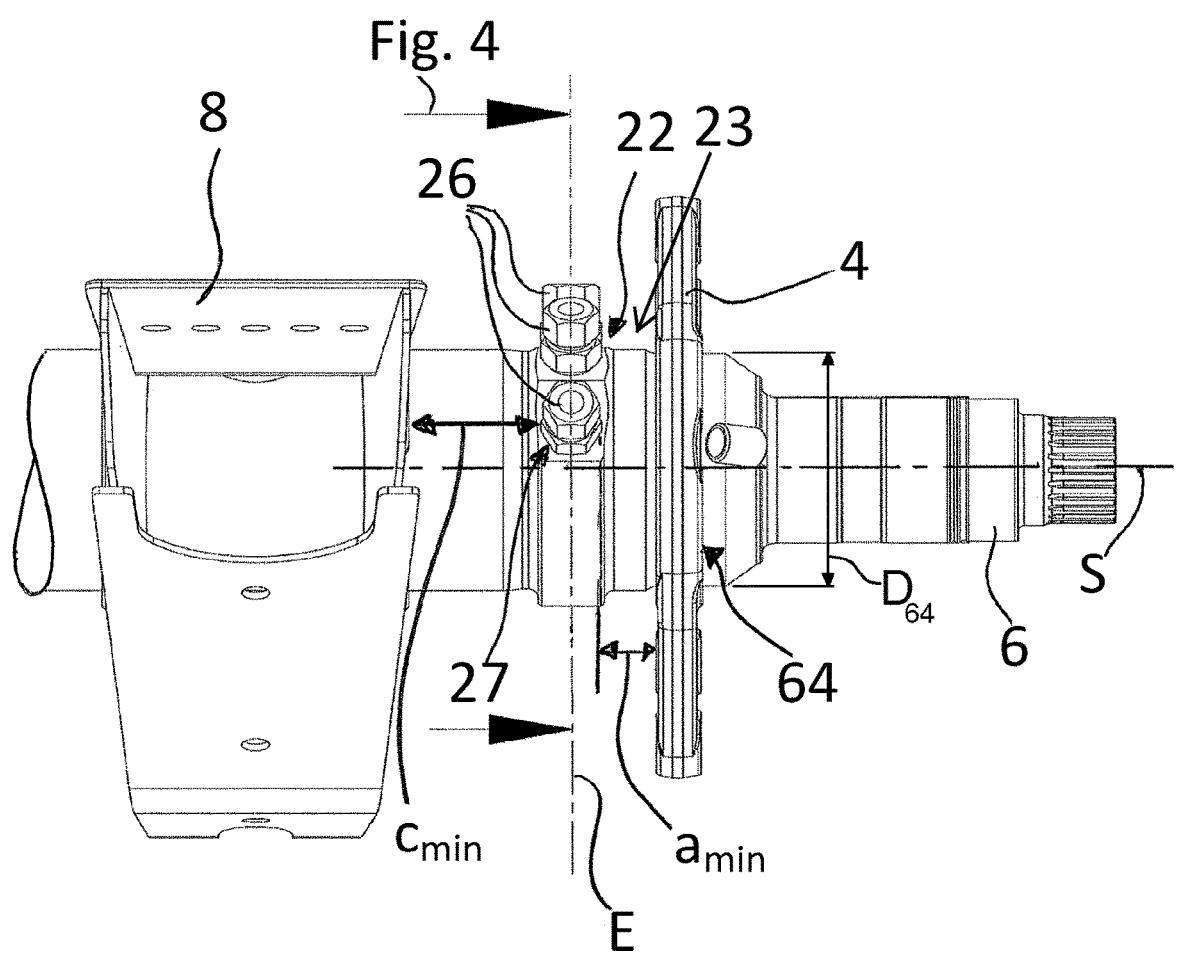
FIG. 3 shows a side view of a further preferred embodiment of an axle system according to the invention.

FIG. 3 shows a side view of a further preferred embodiment of an axle system wherein, in addition to the first and second connecting sections 21, 22, a third connecting section 23 is provided which also lies in the connecting plane E. The third connecting section 23 has a fluid-conducting connection to a third duct 63 (not illustrated). The radius link element 8 is secured in this embodiment to an axle tube which is welded to the axle stub 6 in the direct vicinity of the connecting sections 21, 22, 23. The radius link element 8 is therefore secured indirectly to the axle stub 6 via the axle tube. The further features which are denoted by the same reference symbols as in the embodiment shown in FIG. 1 correspond to the features already described with respect to FIG. 1.

Figure 4:
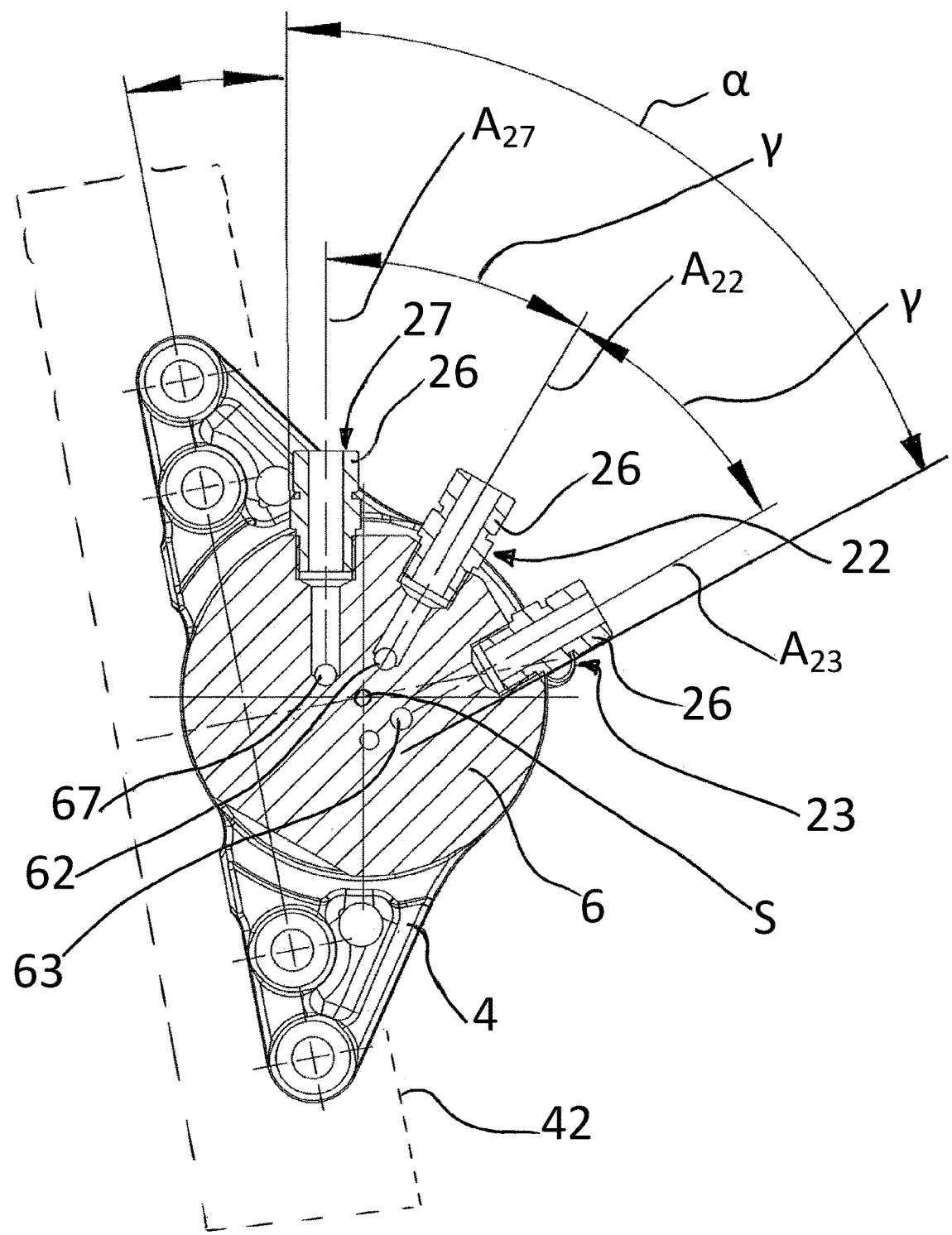
FIG. 4 shows a sectional view through the axle system shown in FIG. 3.

FIG. 4 shows a section through the embodiment of an axle system which is shown in FIG. 3, wherein the connecting plane E is the sectional plane. A screw-in element 26 is provided on each of the connecting sections 21, 22, 23 and screwed in with an external thread into the corresponding drilled hole in the axle stub 6. The connecting sections 21, 22, 23 and the screw-in elements 26 extend in this state essentially in a rotationally symmetrical fashion to one connecting axes $A_{21}, A_{22}, A_{23}$ each. In order to ensure good accessibility of the screw-in elements 26 for the tool for attaching the screw-in elements 26, in this context in each case two adjacent connecting axes $A_{2x}$ span a connecting angle γ lying in the connecting plane E. The two connecting angles γ which are spanned between the three connecting axes $A_{21}, A_{22}, A_{23}$ are preferably identical and good accessibility can be achieved with a small overall installation space requirement for all the screw-in elements 26. The connecting angles are preferably greater than 30° here. The brake carrier 4 which is illustrated in FIG. 4 is particularly preferably a brake carrier 4 for securing a floating caliper 42 and advantageously has four attachment points for securing such a brake caliper 42.

REFERENCE SYMBOLS

21—First connecting section
22—Second connecting section
23—Third connecting section
25—First circle sector
26—Screw-in element
4—Brake carrier
42—Brake caliper
45—Second circle sector
6—Axle stub
61—First duct
62—Second duct
63—Third duct
64—Attachment region
8—Longitudinal link element
α—First sector angle
β—Second sector angle
γ—Connecting angle
$A_{21,22,...}$—Connecting axis
$a_{min}$—Distance between connecting sections and attachment region
$c_{min}$—Distance between connecting sessions and radius link element
E—Connecting plane
S—Stub axis
$D_{64}$—Axle stub diameter

The invention claimed is:

1. An axle system, comprising:
an axle stub;
a first connecting section; and
a second connecting section;
wherein an outer side of the axle stub is substantially rotationally symmetrical about a stub axis and includes two ducts which extend parallel to the stub axis in at least regions of the axle stub;
wherein the first and second connecting sections lie in a connecting plane which is oriented orthogonally with respect to the stub axis;
wherein the axle stub has an attachment region adapted to secure a brake carrier which extends parallel to the connecting plane;
wherein the ducts each open into the first and second connecting sections;
and
wherein a minimum distance of the first and second connecting sections from the attachment region is less than a third of the axle stub diameter in a region of the attachment region.

2. The axle system as claimed in claim 1, wherein a ratio of the minimum distance to the axle stub diameter is between 0.05 and 0.25.

3. The axle system as claimed in claim 2, wherein the ratio of the minimum distance to the axle stub diameter is between 0.1 and 0.2.

4. The axle system as claimed in claim 1, wherein the axle stub has a flattened portion in a region of each of the first and second connecting sections.

5. The axle system as claimed in claim 1, wherein the first and second connecting sections extend within a first circle sector lying in the connecting plane, wherein the circle sector extends with a first sector angle, and wherein the first sector angle lies in a range from 25° to 160°.

6. The axle system as claimed in claim 5, wherein the first sector angle lies in the range of from 45° to 90°.

7. The axle system as claimed in claim 5, wherein the brake carrier with an attachment region for a brake caliper is secured to the axle stub, wherein the brake caliper extends within a second circle sector which is projected into the connecting plane, wherein the second circle sector extends with a second sector angle, and wherein the second sector angle lies in a range from 90° to 240°.

8. The axle system as claimed in claim 7, wherein the second sector angle lies in the range from 160° to 200°.

9. The axle system as claimed in claim 7, wherein the second circle sector does not have an overlap with the first circle sector.

10. The axle system as claimed in claim 1, wherein the brake carrier with an attachment region for a brake caliper is secured to the axle stub, wherein the brake caliper extends within a second circle sector which is projected into the connecting plane; wherein the second circle sector extends with a second sector angle, and wherein the second sector angle lies in a range from 90° to 240°.

11. The axle system as claimed in claim 10, wherein the second sector angle lies in the range from 160° to 200°.

12. The axle system according to claim 1, wherein in a state in which the axle stub is installed on a utility vehicle, the first and second connecting sections are arranged on a side of the axle stub facing away from a roadway.

13. The axle system as claimed in claim 1, wherein the first and second connecting sections each have a screw-in element having an external thread configured to engage the axle stub.

14. The axle system as claimed in claim 1, wherein an intermediate space with a minimum width is located between the first and second connecting sections, and wherein the width is 0.8 to 1.3 times a maximum diameter of the first and second connecting sections.

15. The axle system as claimed in claim 1, wherein the first and second connecting sections are each substantially rotationally symmetrical about one connecting axis each, wherein the first and second connecting axes lie in the connecting plane, wherein the connecting axes span a connecting angle, and wherein the connecting angle is greater than 20°.

16. The axle system as claimed in claim 15, wherein the connecting angle is greater than or equal to 30°.

17. The axle system as claimed in claim 1, wherein a radius link element is secured to the axle stub on a side of the first and second connecting sections facing away from the attachment region, and wherein the minimum distance of the first and second connecting sections from the radius link element is less than two thirds of the axle stub diameter in a region of the attachment region.

18. The axle system as claimed in claim 1, further comprising:
at least one third of each of the first and second connecting sections which lies in the connecting plane are provided on the axle stub.

19. The axle system as claimed in claim 1, further comprising:
a third connecting section provided on the axle stub.

20. The axle system as claimed in claim 19, wherein at least the majority of the first, second, and third connecting sections are at a same distance from the attachment region.

* * * * *